April 14, 1964     H. E. DE BUHR     3,128,870
BALE HANDLING APPARATUS
Original Filed Dec. 7, 1959     2 Sheets-Sheet 1
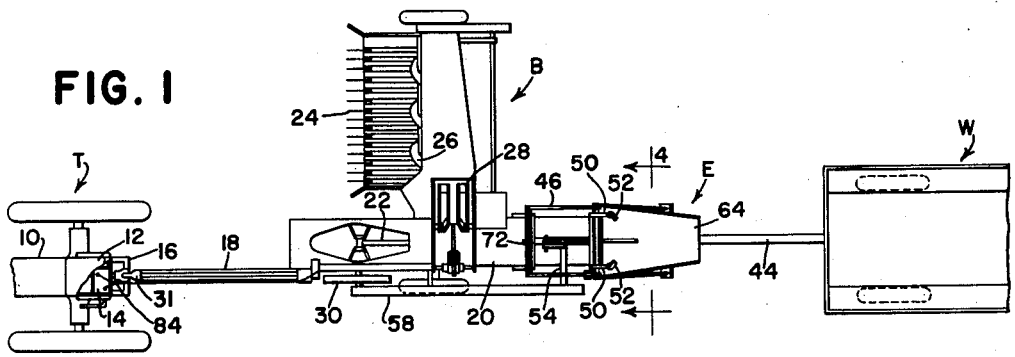

April 14, 1964     H. E. DE BUHR     3,128,870
BALE HANDLING APPARATUS

Original Filed Dec. 7, 1959     2 Sheets—Sheet 2

United States Patent Office 3,128,870
Patented Apr. 14, 1964

3,128,870
BALE HANDLING APPARATUS
Harold E. de Buhr, Ottumwa, Iowa, assignor to Deere & Company, Moline, Ill., a corporation of Delaware
Original application Dec. 7, 1959, Ser. No. 857,588. Divided and this application Mar. 1, 1961, Ser. No. 92,670
3 Claims. (Cl. 198—128)

This invention, the application for which is a division of copending application Ser. No. 857,588, filed December 7, 1959, now abandoned in favor of continuing application Serial No. 242,347, filed December 3, 1962, relates to bale-handling mechanism and particularly to such mechanism as applied in the handling of bales formed and discharged by an agricultural baler to a trailing or otherwise associated wagon or receiving vehicle.

The typical agricultural baler includes pick-up means operative, when the baler is drawn over a field by a tractor or other draft vehicle, to pick-up previously harvested crops, such as hay, and to deliver this crop rearwardly and laterally to a bale chamber in which a plunger or other mechanism operates to form successive bales of predetermined size, weight, etc. Automatic tying mechanism is included in the baler and as the individual bales are completed, the tying mechanism is effective to tie the bales with twine or wire. Each bale when formed serves as a header for a following bale and ultimately the bale first formed is ejected or discharged at the rear end of the bale case, in those cases in which the bale case extends fore and aft or along the line of advance. Until the recent past, the discharged bales were allowed to fall onto the ground and were subsequently picked up, either manually or by special machines. However, with the development of the automatic bale thrower, a typical example of which is disclosed in the U.S. patent to Morrison 2,756,865, the entire baling operation has been improved and rendered substantially completely automatic.

As disclosed in the patent identified above, the bale thrower is mounted at the rear or discharge end of the bale case and receives the individual bales in succession and delivers them rearwardly in a trajectory such that the bales are literally thrown to the trailing wagon.

In the Morrison patent, the bale is discharged from the bale case to receiving means comprising a pair of grippers, one on each of a pair of depending arms, between which the bale is moved to be gripped or seized prior to operation of the arm means to throw the bale to the trailing wagon. According to the present invention, the receiving means is improved by the use of a pan mounted on the lower portions of the arms on a transverse axis and arranged to occupy a normal substantially horizontal position, but the pivot is so arranged relative to the weight of the receiver and bales so that the two overbalance to the rear, thus causing the pan and bale to tilt downwardly so that when the receiver is swung through its throwing arc, departure of the bale therefrom is more readily assured. Hence, the principal object of the present invention resides in improved receiving means for the bale.

The foregoing and other important objects and desirable features inherent in and encompassed by the invention will become apparent as preferred embodiments thereof are disclosed in detail in the ensuing specification and accompanying sheets of drawings, the figures of which are described below.

FIG. 1 is a fragmentary plan view, drawn to a reduced scale, showing a typical train made up of a tractor, baler, bale thrower and trailer or wagon.

FIG. 2 is a fragmentary side elevation, on a scale enlarged over that of FIG. 1, illustrating the bale thrower and its associated mounting, operating and control mechanism.

FIG. 3 is an enlarged plan view as seen generally along the line 3—3 of FIG. 2.

Figure 4:
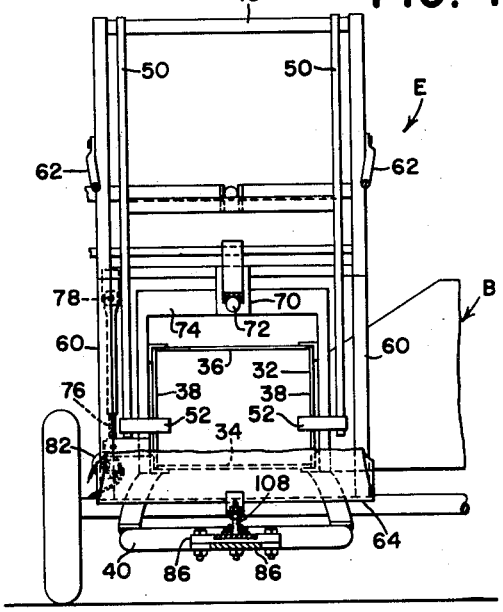
FIG. 4 is a rear elevational view, with portions broken away, as seen generally along the line 4—4 of FIG. 1 and drawn to the scale of FIG. 2.
Figure 6:
FIG. 6 is a section on the line 6—6 of FIG. 5.

In the typical vehicular train shown in FIG. 1, a tractor is designated generally by the letter T, a baler by the letter B, a bale thrower by the letter E and a trailing wagon or equivalent vehicle by the letter W.

The tractor T may be of any conventional construction and its normal line of travel is to the left as seen in FIG. 1. The tractor is provided with the usual main body 10 having an operator's seat 12, a portion of which is broken away to expose a source of energy, here an electrical storage battery 14. The tractor has a drawbar 16 to which is connected the forwardly extending tongue 18 of the baler. The baler has bale-forming means in the form of a fore-and-aft bale chamber 20 in which a plunger (not shown) is reciprocated by a pitman 22 to form bales of material delivered thereto by pick-up means 24 located to the right of the baler (as regarded from the standpoint of its normal line of advance). Material picked up by the pick-up means is moved to the left and into the bale chamber 20 by transverse feeder means 26 and 28. These are conventional components of a baler and are illustrated and described only briefly for purposes of orientation. The crank shaft which drives the pitman 22 is equipped externally within a fly wheel 30 and power for driving the moving parts of the baler is derived in the first instance from the tractor via the usual power take-off and propeller shafting 31.

The rear portion of the bale chamber 20 is continued as an extension which is commonly known as a bale case extension, here made up of a plurality of walls arranged in rectangular fashion to define a rear discharge opening or portion 32. As best seen in FIG. 4, the bale case extension has a floor 34, a top 36 and opposite upright side wall portions 38. In conventional construction, the side walls 38 are specially fashioned to permit variations in the size of the opening 32 but, since these details are known to those versed in the art and form no material part of the present invention, the walls 38 are shown simply and relatively schematically and further description thereof will be avoided.

The rear portion of the baler is equipped with a wagon hitch or drawbar 40 by means of which a pivotal connection on a vertical axis is effected at 42 with a tongue 44 for the wagon or vehicle W. The wagon here may be any conventional farm trailer of the four-wheeled type. From the foregoing, it will be seen that as the vehicular train travels ahead in a straight line, the baler will follow in trailing relationship to the tractor and the wagon will trail the bailer. The draft connection 40–42–44 is normally effected so that the wagon is in rearward alinement with the bale discharge portion or rear opening 32, and the bale thrower or ejector will normally operate to receive discharged or emerging bales from the bale case 20 and by throwing them directly rearwardly will normally assure transfer of the bales to the wagon.

The bale thrower or ejector chosen for purposes of illustration is generally of the type shown in the Morrison patent noted above. For this purpose, it comprises a main support or support means 46 suitably mounted on the baler or otherwise connected into the train (in a manner to be presently described) and having means at its upper end providing a transverse pivot at 48 on an axis transverse to the line of travel. The pivot 48 supports a pair of rigidly cross-connected depending throwing arms 50, the lower end of each of which is provided with a suitable bale-gripping device 52. As best seen in FIG. 1, the devices 52 are spaced laterally apart a distance slightly less than the width of an emerging bale so that as the bale emerges, it forces itself between the devices 52, which are shaped to permit rearward travel of the bale relative to the arms 50 but which enable the devices 52 to bite into the bale when the arms are swung rearwardly and upwardly about the axis 48 by means including a crankshaft 54 and pitman 56. The details of the means for driving the crankshaft 54 are not shown specifically here, since they may be the same as those disclosed in the above-identified Morrison patent. The drive is indicated generally by the numeral 58 as extending from the fly wheel 30 (previously described) to the crankshaft 54. The drive is automatically interruptible and energizible, as by a one-revolution clutch so that the arms 50 operate to swing rearwardly and upwardly only when an emerging bale has assumed a predetermined position between the gripping devices 52.

The support means 46 includes rigid thereon depending extensions 60 which, together with braces 62, support an arcuate bale chute 64. This chute is concentric about the pivot axis 48 for the throwing arms 50. An emerging bale is shown in broken lines at 66 in FIG. 2, from which it will be seen that the bale has emerged to a distance almost enough to energize the bale thrower, which it does by means of actuating a trip arm 68 which trips the one-revolution clutch (not shown) for causing one revolution of the crankshaft 54. This, through the pitman 56, swings the arms 50 upwardly and rearwardly and then downwardly and forwardly. As the arms reach the upper or rearward end of their stroke, the bale 66 continues rearwardly and is thrown into the wagon W by its momentum. As explained in the Morrison patent, the particular arrangement affords sufficient acceleration of the arms to cause the bale 66 to depart as described. Also, as previously described, the gripping devices 52 are so constructed as to enable the bale to continue its travel rearwardly in a trajectory designed to enable it to enter the wagon.

The foregoing follows somewhat the basic operation of a vehicular train equipped with a bale thrower such as that forming the subject of the Morrison patent. As long as the train travels in a straight line, normal functioning can be expected and the baling operation will be automatic, the baler forming and tying the bales and the thrower E delivering the bales to the wagon W. However, as noted above, the problem that arises in connection with "misses" as respects non-delivery of bales to the wagon on turns has created a need for the improvement set forth here. This improvement involves mounting of the support 46 on the baler in such manner that the entire bale-handling mechanism E may tilt laterally about a fore-and-aft axis, which axis lies generally along the line of advance of the train; or, stated otherwise, the axis is generally parallel to the path of emergence of the bales from the bale case. This description fits the situation when the baler has a bale case that extends fore and aft or along the line of travel. It is to be recognized, however, that some balers are constructed with their bale cases transverse to the line of advance and in these cases the principles of the present invention could be employed but it must be observed that the mounting axis may not necessarily be parallel to the bale case. Nevertheless, these are mere details that may be worked out according to particular situations and reference thereto is made only for the purpose of signifying that the invention has wider aspects than the specific characteristics illustrated.

The support means by which the support 46 is mounted on the baler includes a pair of depending ears 70 on the support 46, which ears are received by a fore- and-aft shaft 72 which is in turn carried by suitable supporting structure 74 on the bale case 20. The mounting structure 74 is sufficiently long in fore-and-aft dimension to provide adequate support for the bale handling structure E, the mass of which is substantially equally divided above and below the pivot axis through the shaft 72. In view of the pivotal mounting at 72, the entire apparatus E is capable of lateral swinging about the pivot so as to swing from a normal central position as illustrated to lateral positions offset to either side of that central position. Since this involves a slight misalinement between the front of the chute 64 and the rear discharge portion 32 of the bale case, the chute diverges forwardly so that its front or receiving end is of increased width to accommodate misalinement within the ranges expected to be encountered. This will not effect any changes in the relationship of the gripping devices 52, since the bale is inherently flexible or resilient, as are the devices 52, and the bale will readily enter onto the mechanism in either tilted phase thereof. Considering the situation broadly, the chute 64 and the grip means 52 may be regarded as receiving means for receiving the emerging bale, as at 66, when it is ejected from the bale case 20.

The improvement includes adjusting means for changing the lateral position of the ejector or bale-handling means E about the axis of the fore-and-aft shaft 72. In the instance illustrated, the adjusting means includes a screw device 76 having one part thereof connected to the support 46, as at 78 and another part thereof driven by appropriate gearing at 80 powered by an electric motor 82. This is, of course, only representative of many means which may be used. The motor 82 is energized from the tractor storage battery 14 as via suitable electrical connections, indicated generally at 84. As will be brought out below, the electrical connections are controlled by switches so that the actuation or energizing of the screw means 76 is made responsive to changes in lateral position between the wagon and the baler. For the immediate present, suffice it to note that when the screw device is rotated in one direction, it will rock the bale-handling mechanism E in one direction, and vice versa. When the device is de-energized, it will hold the position of the bale-handling mechanism.

The control mechanism for energizing and deenergizing the means 76–82 is arranged so as to be responsive to changes in lateral angularity between the wagon and baler, specifically changes as reflected by the wagon tongue 44 and mechanism associated therewith. For this purpose, the baler drawbar 40 has a rearward extension plate 86 via which the clevis pin connection at 42 is made to the tongue 44. This plate carries thereon a pair of electrical switches 88 and 90. The switches are appropriately connected into the electrical circuit in such manner as to drive the motor 82 selectively in opposite directions. For example, when the switch 88 is closed, the motor will drive in one direction and when the switch 90 is closed, the other switch will be open and the motor will drive in the opposite direction. The mounting of the switches 88 and 90 on the plate 86 is accomplished by mounting the switches first on an intermediate plate 92 which in turn is pivoted on a vertical axis at 94 to the plate 86. The pivot 94, which is effected by a pin, is extended to carry a link 96 which in turn is pivotally connected at 98 to a second link 100 that extends between the top of the clevis pin 42 and a suitable bracket 102 on the tongue 44. The link 96 is suitably slotted as shown in FIG. 3 to accommodate changes in motion and position. The forward end of the link is in the form of a T having opposite arms 104 which selectively activate the switches 88 and 90.

The switch-mounting plate 92 has a bifurcated forward end afforded by a pair of extensions 106 between which is received a ball-headed member 108 that is in turn rigidly connected to a lower forward portion of the chute 64.

In normal or straight-ahead travel of the train, both switches 88 and 90 are open, because the forward ends 104 of the link 96 are centered, which is a function of the fact that the tongue 44 is trailing directly behind the hitch point 42. When the tractor makes a left turn, for example, it will also cause the baler to turn to the left relative to the wagon W. This will cause the link 96 to swing in a clockwise direction as seen in FIG. 3, effecting closure of the switch 90 while leaving the switch 88 open. The switch 90 is connected into the circuit as by a connecting line 110, which drives the motor 82 in such direction as to shorten the screw device 76. This results in lateral movement of the bottom portion of the ejector means E to the right, to compensate for the misalinement of the normal register between the chute or receiving means 64 and the front of the wagon. If a bale is about to be delivered by the arms 50, it will now be delivered into the wagon rather than missing the wagon. As the chute 64 shifts to the right as noted, the depending member 108, acting between the extensions 106 on the switch-mounting plate 92, shifts the plate in a clockwise direction about the pivot 94, thus moving the plate relative to the link 96, or in such direction as to cause the switch 90 to move away from the arm 104, resulting in breaking the circuit to the motor so that the motor does not overdrive the mechanism E. In other words, the arrangement provides a conventional type of follow-up so that movement of the ejector means E is proportional to lateral deviation of the wagon from straight-ahead travel. Just the reverse occurs when turning is to the right.

Figure 5:
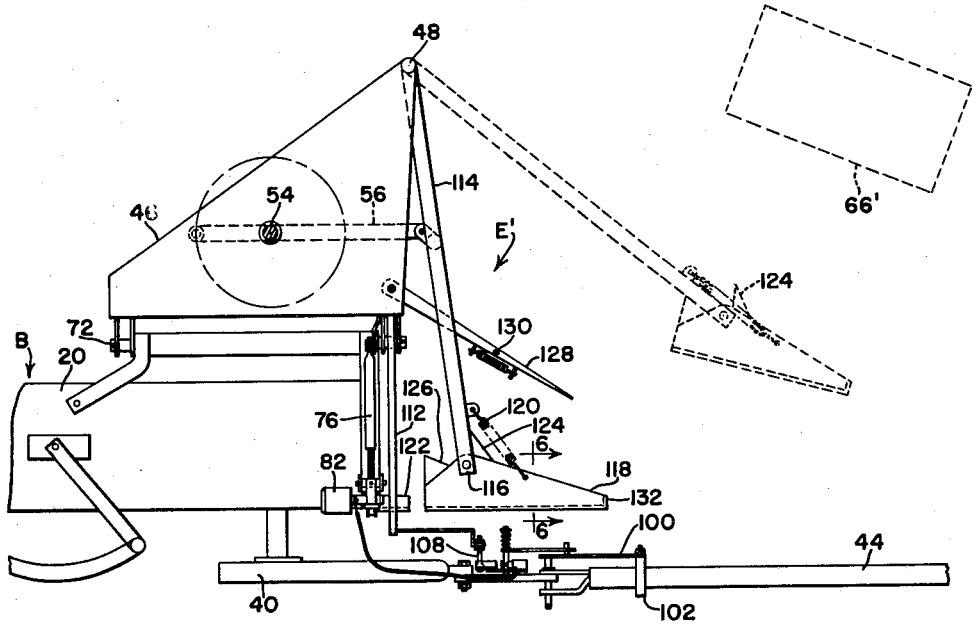
FIG. 5 is a view similar to FIG. 2 but showing a modified form of bale-handling mechanism.

The modified form of bale-handling mechanism, designated E' in FIG. 5, includes a different type of throwing means but incorporates therein the control and adjusting means previously described. Hence, to the extent that the two structures are similar, identical reference characters will be employed without re-description. For example, the support means 46 is mounted on the baler on a fore-and-aft axis via the shaft 72 and the position of the structure is changed by the screw means 76 and electric motor 82 operated by switch means such as those previously described. However, in view of the absence from the structure of FIG. 5 of a chute corresponding to the chute 64 in FIG. 2, the member 108 must be carried by a separate means, which here takes the form of an arm 112 rigidly carried by and depending from the support 46.

The throwing means comprises a pair of depending arms 114 which have their lower portions pivotally connected at 116 on a common transverse axis to a receiving means in the form of a tray or pan 118, the width of which is slightly greater than the width of the discharge opening 32 in the bale case so as to accommodate minor misalinement as the ejector means E' is shifted laterally. The design of the pan 118 is such that a greater portion of its weight is rearwardly of the pivot axis at 116, but biasing means, such as tension springs 120, normally hold the pan in a horizontal position as shown, which is in horizontal alinement with a chute extension 122 on the floor 34 of the bale case. A stop 124 operates between the pan and the lower portion of at least one of the arms to secure the horizontal position which may be overcome by the emergence of a bale onto the pan. The pan then overbalances to the rear and is stopped in that position by a stop 126 which engages between the forward portion of the pan and the associated portion of at least one of the arms 114. This will be clear from the dotted line position of the structure as illustrated, wherein the numeral 66' designates a bale being thrown from the rearwardly swung arms 114, the operation of which depends on the crankshaft 54 and pitman 56 as previously described. In this case, the trip arm 68 is replaced by a trip arm 128 which is of two-piece construction allowing the rear portion of the arm to fold upwardly about a pivot 130 so that when the bale is thrown it does not damage the arm. When the bale emerges from the bale case onto the pan 118, it need not be gripped by gripping devices such as those at 52, since the bale is supported by the pan. A lip 132 at the rear of the pan may be used to prevent the bale from sliding rearwardly off the pan. During operation of the arms 114 to the throwing position illustrated in broken lines, the momentum keeps the bale in place until the end of the throwing stroke is attained, and the bale continues to accelerate beyond the pan until it reaches the wagon. Since this mechanism does not rely upon gripping devices such as those at 52 in FIGS. 1-4, differences in density of the bale are immaterial. For example, in loose bales, the gripping devices 52 do not secure as good a grip as they do in tighter bales, but this difference has no effect on the pan 118 since the bale is supported on the bottom thereof.

Features of the invention other than those categorically enumerated will readily occur to those versed in the art, as will many modifications and alterations in the preferred embodiments illustrated and described, all of which may be achieved without departure from the spirit and scope of the invention.

What is claimed is:

1. In combination with a baler having an elongated bale chamber including side walls, a floor and a top terminating in a discharge opening through which bales emerge along said floor as the baler operates: bale-handling mechanism comprising a support adjacent to said opening and having pivot means on an axis above the opening and transverse to the length of the bale case; means connecting the support to the baler; a bale receiver normally positioned as an extension of but separate from the floor to receive a bale emerging from said opening, said receiver having a normally generally horizontally positioned bottom on which the received bale is supported; arm means pivoted at an upper end thereof to said pivot means and normally depending to a lower portion adjacent to the receiver; pivot means connecting the receiver to said lower portion on a transverse axis offset toward to the discharge opening as respects the center of gravity of the receiver and a received bale whereby a received bale tilts the bale received so that its bottom slopes downwardly and away from the floor; means biasing the receiver to the aforesaid position in which its bottom is normally generally horizontal; and means for swinging the arm means away from the opening and about the first-mentioned axis to carry the receiver and bale received thereby remotely from said opening.

2. In combination with a baler having an elongated bale chamber including side walls, a floor and a top terminating in a discharge opening through which bales emerge along said floor as the baler operates: bale-handling mechanism comprising a support adjacent to said opening and having pivot means on an axis above the opening and transverse to the length of the bale case; means connecting the support to the baler; a bale receiver normally positioned as an extension of but separate from the floor to receive a bale emerging from said opening, said receiver having a bottom on which the received bale is supported; arm means pivoted at an upper end thereof to said pivot means and normally depending to a lower portion adjacent to the receiver; means connecting the receiver to said lower portion; means for swinging the arm means away from the opening and about the first mentioned axis to carry the receiver and bale received thereby remotely from said opening and said means connecting the receiver to the arm means including a transverse pivot enabling the receiver to tilt downwardly relative to the arm means and in the direction of travel of the arm means during swinging thereof away from the opening.

3. In combination with a baler having an elongated bale chamber including side walls, a floor and a top terminating in a discharge opening through which bales emerge along said floor as the baler operates: bale-handling mechanism comprising a support adjacent to said opening and having pivot means on an axis offset from the opening; means connecting the support to the baler; a bale receiver normally positioned as an extension of but separate from the floor to receive a bale emerging from said opening, said receiver having a bottom on which the received bale is supported; arm means pivoted at one end thereof to said pivot means and normally extending to a second end adjacent to the receiver; means connecting the receiver to said lower portion; means for swinging the arm means away from the opening and about the first-mentioned axis to carry the receiver and bale received thereby remotely from said opening; and said means connecting the receiver to the arm means including a pivot enabling the receiver to tilt downwardly relative to the arm means and in the direction of travel of the arm means during swinging thereof away from the opening.

References Cited in the file of this patent

UNITED STATES PATENTS

| | | |
|---|---|---|
| 1,912,360 | Blanchard | June 6, 1933 |
| 2,393,435 | Wachter | Jan. 22, 1946 |
| 2,756,865 | Morrison et al. | July 31, 1956 |
| 2,911,758 | Carson | Nov. 10, 1959 |